United States Patent [19]
Bouchard et al.

[11] 3,753,759
[45] Aug. 21, 1973

[54] METHOD OF MANUFACTURING ARC DISCHARGE LAMPS

[75] Inventors: Andre C. Bouchard, Peabody; Peter W. Gaudet, Lynn; Martha J. B. Thomas, Winchester, all of Mass.

[73] Assignee: Sylvania Electric Products, Danvers, Mass.

[22] Filed: Sept. 3, 1971

[21] Appl. No.: 177,835

Related U.S. Application Data

[63] Continuation of Ser. No. 694,815, Jan. 2, 1968, abandoned.

[52] U.S. Cl.............. 117/33.5 L, 117/62, 117/97, 313/109, 313/220, 313/221, 252/301.3
[51] Int. Cl.......................... B44d 1/44, C03c 17/30
[58] Field of Search.............. 117/33.5 L, 62, 97; 313/109, 220, 221; 252/301.3

[56] References Cited
UNITED STATES PATENTS

| | | |
|---|---|---|
| 2,295,626 | 9/1942 | Beese.................................. 313/221 |
| 2,778,793 | 1/1957 | Thomas et al......................... 117/62 |
| 2,838,707 | 6/1958 | Schwing et al........................ 313/109 |
| 3,017,365 | 1/1962 | Harrison.......................... 252/301.3 |
| 3,018,187 | 1/1962 | Boyce et al........................... 313/109 |
| 3,094,641 | 6/1963 | Gungle et al. ........................ 313/109 |
| 3,205,394 | 9/1965 | Ray..................................... 313/109 |
| 3,059,133 | 10/1962 | Wanmaker et al. .................. 313/109 |
| 3,377,494 | 4/1968 | Repscher............................. 313/109 |
| 3,414,433 | 12/1968 | Van Bramer ........................ 117/106 |

*Primary Examiner*—William D. Martin
*Assistant Examiner*—William R. Trenor
*Attorney*—James Theodosopoulos

[57] ABSTRACT

An atmosphere of nitrogen dioxide is used in baking phosphor-coated lamps during manufacture, thereby reducing the baking time and temperature required for elimination of the organic binders in the phosphor coating. Improved lamp efficiency and maintenance also results from the use of the nitrogen dioxide.

4 Claims, No Drawings

METHOD OF MANUFACTURING ARC DISCHARGE LAMPS

This is a continuation, of application Ser. No. 694,815, filed Jan. 2, 1968, now abandoned.

BACKGROUND OF THE INVENTION

1. Field of the Invention

This invention relates to phosphor-coated arc discharge lamps. It particularly relates to the baking of such lamps for the purpose of oxidizing and eliminating the organic constituents of the phosphor coating.

2. Description of the Prior Art

In low pressure arc discharge lamps, such as fluorescent, and high pressure arc discharge lamps, such as mercury vapor, a phosphor is commonly disposed on the inner surface of an outer transparent glass envelope. The phosphor is excited by the mercury radiation from the arc and emits visible light.

The phosphor is deposited on the envelope from a suspension of the powder in a suitable vehicle. Such a vehicle usually comprises a solvent and an organic binder. The solvent readily evaporates but the binder is usually eliminated by baking the envelope in air under conditions sufficient to completely oxidize the binder and remove it from the system in gaseous form. Temperatures as high as 500° or 600° C. are commonly used.

One of the problems that can result from the baking process is incomplete elimination of the organic binder, which leaves a carbonaceous residue on the phosphor. This residue discolors the phosphor to a light gray and reduces the efficiency of the lamp in at least two ways; first, it reduces the amount of ultraviolet radiation from the arc that reaches and excites the phosphor to emission; second, the transparency and reflectance of the phosphor is lowered, thereby reducing the amount of radiation emitted by the phosphor. In addition, the carbonaceous residue can enter the arc stream and reduce the efficiency of the lamp.

Another problem can occur with phosphors, the activators of which are in an intermediate valence state as, for example, clacium zinc orthophosphate actived by divalent tin. The high temperatures used during baking can either oxidize or reduce the tin to the tetravalent or elemental state, respectively, depending upon the baking atmosphere conditions. Both phenomena would reduce the activation and efficiency of the phosphor.

Still another problem that can occur from high temperature baking results from the diffusion of sodium from the glass envelope to the inner surface of the envelope. The sodium can react with mercury within the envelope to form a dark amalgam coating that diminishes the light transparency of the envelope.

Thus, it is desirable to reduce the time and/or temperature of the baking process in order to alleviate these problems and still obtain substantially complete elimination of the organic constituents in the phosphor coating.

SUMMARY OF THE INVENTION

According to our invention, heating the phosphor coating of an arc discharge lamp in an atmosphere of nitrogen dioxide reduces the time and/or temperature required for oxidation and elimination of the organic constituents of the phosphor. The process can also result in an improvement in the efficiency and maintenance of the lamp. It is not necessary for the oxidizing atmosphere to consist entirely of nitrogen dioxide since gaseous mixtures having concentrations as low as 1 percent nitrogen dioxide have reduced the time and/or temperature processing requirements and have improved the efficiency and maintenance of the lamp.

The major advantage to the use of nitrogen dioxide as an oxidizing atmosphere resulted from the lower temperatures that could be used in processing the phosphor-coated lamp envelope. Temperatures as low as 250° C. for a period of 2 to 20 minutes were satisfactory for the purpose of oxidizing and eliminating the organic constituents of the phosphor binder. The reduced processing temperature resulted in less discoloration of the phosphor, less diffusion of sodium from the glass to the inner surface of the glass envelope and improved lamp efficiency and maintenance. These improvements were greater in lamps, the phosphors of which were activated by a metal in a reduced valence state.

In typical cases the inner surface of tubular lamp envelopes, both ends of which were open, were flushed with a phosphor suspension to deposit a thin phosphor coating thereon, as is known in the art. The phosphor suspension comprised a solvent, such as xylol, and an organic binder, such as ethylcellulose or nitrocellulose, in which the phosphor powder was dispersed. The phosphor coating was then dried to remove the solvent. The envelopes were then heated to temperatues between 250° and 500° C. for 2 to 20 minutes while nitrogen dioxide was passed through the envelope at a flow rate of about 500 milliliters per minute. After cooling, electrodes were inserted in the ends of the envelopes which were then exhausted, filled and sealed to complete the lamps.

Table I below, illustrates the lumen output, efficiency in lumens per watt (LPW) and maintenance, both initially and afer 100 hours operation, of two 15T8 lamps. The control was processed in a baking atmosphere air for 2 minutes at 500° to 600° C. and the "$NO_2$ process" lamp was processed in a baking atmosphere of nitrogen dioxide for 2 minutes at 400°C.

TABLE I

|  | INITIAL Lumens | LPW | 100 HOURS Lumens | LPW | Maintenance |
|---|---|---|---|---|---|
| Control | 936 | 62.8 | 59.9 |  | 95% |
| $NO_2$ Process | 958 | 65.1 | 952 | 62.4 | 96% |

It can be seen that the "$NO_2$ process" lamp has an efficiency (LPW) approximately 4 percent higher than the "control" lamp both initially and after 100 hours of lamp operation. Also, the maintenance is 1 percent better after 100 hours operation.

Reflectivity tests at various wavelengths in the visible spectrum, on the phosphors of the lamps of Table I are shown in Table II. The results are expressed as a percentage of the reflectivity of a white magnesium oxide standard.

TABLE II

| | WAVELENGTH IN NANOMETERS | | | | |
|---|---|---|---|---|---|
| | 350 | 450 | 550 | 650 | 750 |
| Control | 85% | 87% | 89% | 90% | 91% |
| $NO_2$ process | 93% | 95% | 96% | 97% | 98% |

The higher reflectivity of the "$NO_2$ prcoess" phosphor indicates that it was discolored less than the "control" phosphor during the baking process. The phosphor used in these tests was calcium halophosphate activated by antimony having a +3 valence and manganese having a +2 valence. It is believed that the slight discoloration is partially due to the change of valence of a small percentage of the activators.

Moreover, it was found that a water rinse of the phosphor coating after the nitrogen dioxide baking process improved the efficiency and maintenance of the lamps to an even greater extent. Table III, following, illustrates the results of two 40T12 lamps, one a control as before, and one processed and risned as described.

TABLE III

|  | INITIAL Lumens | LPW | 100 HOURS Lumens | LPW | Maintenance |
|---|---|---|---|---|---|
| Control | 2256 | 55.4 | 2088 | 51.8 | 93% |
| NO$_2$ process plus rinse | 2436 | 59.5 | 2304 | 56.6 | 95% |

The phosphors used in the 40T12 lamps were a mixture of an alkaline earth orthophosphate activated by divalent tin and strontium halophosphate activated by antimony. The results show that the "NO$_2$ process plus rinse" lamp had an initial efficiency 7 percent greater than the control lamp and 9 percent greater after 100 hours operation. In addition, the maintenance was 2 percent higher than the control after 100 hours.

It is believed that the water rinse results in an improvement in lamp efficiency, in some cases, because the water washes out of the phosphor coating any trace quantities of nitrogen dioxide which may have been absorbed by the phosphor particles. Any nitrogen dioxide remaining in the lamp can reduce the lamp efficiency and maintenance by liberating oxygen as a result of the ultraviolet radiation from the arc which, in turn, can oxidize the mercury present to a light-diminishing film of mercury oxide.

The reflectivity results on a phosphor which was baked in an atmosphere of 1 percent nitrogen dioxide and 99 percent air are shown below in Table IV.

TABLE IV

| | WAVELENGTH IN NANOMETERS | | | | |
|---|---|---|---|---|---|
| | 400 | 450 | 550 | 650 | 750 |
| Control | 86% | 87% | 89% | 90% | 91% |
| 1% NO$_2$ process | 88% | 90% | 93% | 94% | 95% |

It can be seen that the use of an atmosphere containing 1 percent nitrogen dioxide yields a higher reflectivity than the air atmosphere used in processing the control. However, the improvement is not as great as when 100 percent nitrogen dioxide is used, as shown by the results in Table II.

DESCRIPTION OF THE PREFERRED EMBODIMENT

In the manufacture of an electric discharge lamp, in accordance with one embodiment of this invention, about 125 grams of powdered phosphor were suspended in a liquid vehicle comprising 85 grams of xylol, 11 grams of butanol and 2 grams of ethyl cellulose. The suspension was ejected through a nozzle into the upper end of a vertical tubular glass envelope open at both ends, so that a curtain of suspension flowed down the entire interior surface of the envelope, depositing a phosphor coating thereon. The coating was slowly dried, to evaporate the solvents, in a hot air oven for a period of 1 hour at a gradually increasing temperature reaching a maximum of about 145° F. The phosphor coated envelope was then placed horizontally in an electrically heated oven and a one-fourth inch diameter stainless steel inlet tube was axially positioned about one inch from one end of the envelope. The envelope was heated and maintained at a temperature of 400° C. for 2 minutes while 800 milliliters per minute of nitrogen dioxide flowed into the envelope from the inlet tube. The opposite end of the envelope was located adjacent to an exhaust duct in order to discharge the toxic nitrogen dioxide into a purification tower and to aid the flow of the nitrogen dioxide through the envelope.

After cooling, the envelope was completely immersed, vertically, in a tank of deionized water, removed and drained. The envelope, with phosphor coating thereon, was then dried in a forced air oven at 325° F. for 1 hour. The lamp was then completed by attaching the ends, exhausting, filling and sealing by methods known to the art. The output and efficiency of the lamp are shown in Table III, supra.

In another example of the invention the process was the same with the exception that the envelope was heated at 250° C. for 10 minutes while nitrogen dioxide flowed through the envelope. The reflectivity of this phosphor was about 5 to 7 percent better than that of the phosphor processed in air.

A third example of another oxidizing atmosphere used was a mixture of 1 percent nitrogen dioxide and 99 percent air for a period of 2 minutes at an envelope temperature of 500° C. The reflectivity of the phosphor is shown in Table IV, supra.

It is apparent that modifications and changes can be made within the spirit and scope of the instant invention, but it is our intention to be limited only by the appended claims.

We claim:

1. A process for coating the inner surface of a glass envelope of an electric discharge lamp with phosphor material comprising:
    suspending the phosphor material in an organic containing liquid vehicle;
    depositing said suspension of phosphor material on the inner surface of the glass envelope;
    drying said phosphor coating and heating in contact with an oxidizing atmosphere consisting essentially of 1 to 100 percent nitrogen dioxide and from 0 to 99 percent air at a temperature sufficient to oxidize and eliminate said organic material from said phosphor material.

2. The process of claim 1 wherein said heating is at least at a temperature of 250° C.

3. The process of claim 1 wherein said oxidizing atmosphere flows through said envelope during said heating.

4. The process of claim 1 including the step of rinsing said phosphor coated envelope with water after said heating.

* * * * *